US008420148B2

(12) United States Patent
Illsley et al.

(10) Patent No.: US 8,420,148 B2
(45) Date of Patent: Apr. 16, 2013

(54) BEVERAGE WHITENING COMPOSITION AND METHOD

(75) Inventors: Garth C. Illsley, Kentville (CA); Dennis P. Dickinson, Dartmouth (CA)

(73) Assignee: A.C. Dispensing Equipment, Inc., Lower Sackville, Nova Scotia (CA)

( * ) Notice: Subject to any disclaimer, the term of this patent is extended or adjusted under 35 U.S.C. 154(b) by 1010 days.

(21) Appl. No.: 11/687,857

(22) Filed: Mar. 19, 2007

(65) Prior Publication Data

US 2007/0218181 A1  Sep. 20, 2007

Related U.S. Application Data

(60) Provisional application No. 60/783,417, filed on Mar. 20, 2006.

(51) Int. Cl.
*A23C 13/00* (2006.01)

(52) U.S. Cl.
USPC ............................ 426/586; 426/580; 426/587

(58) Field of Classification Search .................. 426/548, 426/586, 658
See application file for complete search history.

(56) References Cited

U.S. PATENT DOCUMENTS

| | | | | |
|---|---|---|---|---|
| 2,738,279 A | * | 3/1956 | Stimpson et al. | 426/565 |
| 3,108,875 A | * | 10/1963 | Bell | 426/658 |
| 4,045,589 A | | 8/1977 | Petrowski et al. | |
| 4,784,865 A | * | 11/1988 | Baker et al. | 426/250 |
| 5,366,751 A | * | 11/1994 | Pordy | 426/580 |
| 6,060,105 A | * | 5/2000 | Meister et al. | 426/580 |
| 6,248,389 B1 | | 6/2001 | Biller et al. | |
| 6,447,830 B1 | | 9/2002 | Cevallos et al. | |
| 6,548,101 B2 | | 4/2003 | Cevallos et al. | |
| 6,627,243 B2 | | 9/2003 | Cherian et al. | |
| 6,824,810 B2 | | 11/2004 | Sargent et al. | |
| 6,887,505 B2 | | 5/2005 | Reaves et al. | |
| 2003/0054079 A1 | | 3/2003 | Reaves et al. | |
| 2005/0236429 A1 | | 10/2005 | Duck et al. | |

FOREIGN PATENT DOCUMENTS

| | | |
|---|---|---|
| EP | 0714609 | 5/2000 |
| GB | 1415844 | 11/1975 |

OTHER PUBLICATIONS

Mark Johnson "Casein—How it colors cheese" Spring 1999 Wisconsin Center for Dairy Research Dairy Pipline vol. 11, No. 2, pp. 1-5.*

(Continued)

*Primary Examiner* — Humera Sheikh
*Assistant Examiner* — Felicia King
(74) *Attorney, Agent, or Firm* — Kathleen E. Marsman; Borden Ladner Gervais LLP

(57) ABSTRACT

A beverage whitening composition for replacing cream or milk in a reduced volume comprising: cream having a higher butter fat content than the cream or milk to be replaced; milk having a lower butter fat content than the cream or milk to be replaced; and serum solids, such as skim milk powder. The composition has the beverage whitening ability of the cream or milk to be replaced in a target volume of from 30% to 95% of the volume of cream or milk to be replaced. The composition is formulated so that from 300 mL to 950 mL of the composition has the whitening ability of 1 liter of the cream or milk to be replaced. The composition is useful for replacing conventional coffee cream in dispensers containing bags of cream so as to reduce frequency of bag replacement.

20 Claims, 1 Drawing Sheet

OTHER PUBLICATIONS

Stiritz et al. "A Comparison of the Butterfat Content and Total Solids Content of Creams of Varying Richness Separated from the same sample of Milk" 1920 Journal of Dairy Science vol. 3 No. 6 pp. 522-528.*

Harold McGee "On Food and Cooking" 2004 (6 pgs.).*

Phillips et al. "The Influence of Fat on the Sensory Properties, Viscosity, and Color of Lowfat Milk" 1995 Journal of Dairy Sicent vol. 78 No. 6 1258-1266.*

Canadian Patent Application No. 2,582,130: Office Action dated Apr. 7, 2009.

* cited by examiner

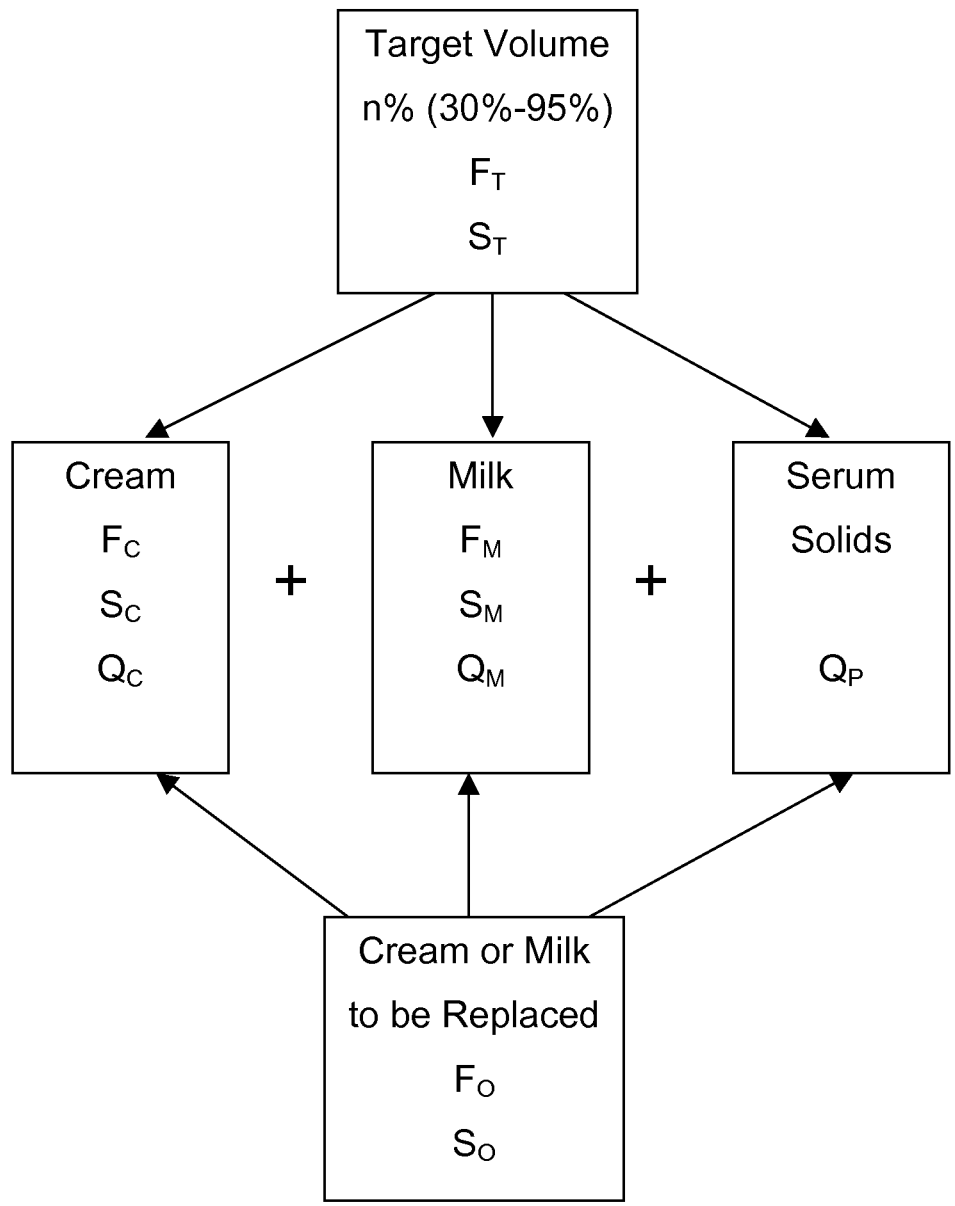

BEVERAGE WHITENING COMPOSITION AND METHOD

CROSS REFERENCE TO RELATED APPLICATIONS

This application claims the benefit of and priority to U.S. Provisional Patent Application No. 60/783,417, filed Mar. 20, 2006, the entirety of which is incorporated by reference herein.

FIELD OF THE INVENTION

The present invention relates generally to a beverage whitening composition. More particularly, the present invention relates to a liquid composition including primarily milk-based ingredients for whitening hot beverages such as coffee or tea.

BACKGROUND OF THE INVENTION

The most common method of whitening a beverage such as coffee or tea is to add cream or milk. Coffee shops that dispense large volumes of cream or milk may use dispensing equipment that contains large fluid volumes. One example of such dispensing equipment is described in applicant's co-pending U.S. patent application Ser. No. 10/830,033 published as U.S. Patent Application Publication No. 2005/0236429 A1, the entirety of which is herein incorporated by reference. Control of dispensing volume may be an available feature of the dispensing equipment, having the advantage of rendering a consistent product when a customer orders, for example, a whitened beverage with "double cream". A coffee shop using dispensing equipment will periodically need to replace the bags of cream or milk contained therein. Bag replacement frequency may be, for example, every 3 or 4 hours. This replacement frequency increases during the busiest times of the day, which can create delays in customer service.

Cream dispensed to whiten a beverage such as coffee typically contains 10% or 18% butter fat (b.f.). It is not optimal to consumer acceptance to simply substitute 20% or 35% b.f. cream, respectively, at half of the normally dispensed volume, because although the b.f. content is increased, the whitening effect attributable to non-fat milk solids is not achieved. A beverage so whitened is not as acceptable to the customer, and can clearly be distinguished from the 10% or 18% cream to which a customer may have grown accustomed.

Beverage whitening products other than cream or milk are available, but rarely provide the same taste and organoleptic properties as cream or milk. Customers in a coffee shop who have become used to cream or milk would not find such substitutes acceptable. Condensed milk offers a highly viscous consistency, and is not easily dispensed or dispersed into a beverage. Powdered whitener formulations are not dispensable in a liquid form, and also require additional agitation to disperse properly into a beverage.

U.S. Pat. No. 6,887,505 (Reaves et al.) teaches a milk concentrate formed through ultra-high temperature pasteurization (UHT), intended for reconstitution into a milk beverage. The concentrate is formed by evaporating liquid from a fresh milk product, which requires labor-intensive processing. In general, conventional concentrated or condensed milk products are formed in this way, by a processing-intensive step involving removal of water. Prior to reconstitution, such concentrates would not be an acceptable addition to beverages such as coffee or tea.

U.S. Pat. No. 6,627,243 (Cherian et al.) describes a cream substitute containing butter, a thickening agent, and a food protein. The cream substitute is intended for cooked or baked food products normally requiring cream, such as sauces, soups or cream-filled pastries, and requires starch or gum as a thickening agent. European Patent EP 0 714 609 B1 describes whipping cream compositions with low fat content that are suitable for preparing whipped or frozen desserts. U.S. Pat. No. 6,248,389 (Biller et al.) describes a cream substitute for addition to food recipes that require cream. The substitute is provided in a non-liquid form, such as a cube, powder, or a semi-solid (extrudable) product. Such products as these are not appropriate as whiteners for beverages.

U.S. Pat. No. 4,045,589 (Petrowski et al.) provides a non-dairy fat emulsion suitable for whitening coffee. The emulsion includes a variety of non-milk solids that would impact the taste of coffee when compared with cream. U.S. Pat. No. 6,824,810 (Sargent et al.) describes a creamer composition that may be in either liquid or powdered form containing non-dairy ingredients that are microparticulated to specified dimensions so as to prevent aggregation of particles.

Others have attempted to provide concentrated coffee products to which water can be added. U.S. Pat. No. 6,447,830 and No. 6,548,101 (both to Cevallos et al.) describe a whitened coffee concentrate that includes milk solids as well as coffee solids, which can be constituted to an appropriate strength for consumption. Patent GB 1415844 describes a whitened coffee concentrate, including a coffee extract, to which water may be added to reconstitute a coffee beverage.

There is a need for a beverage whitening composition capable of achieving taste, whitening, and organoleptic properties similar to cream or milk when added to a beverage, when delivered to the beverage in a reduced volume.

SUMMARY OF THE INVENTION

It is an object of the present invention to obviate or mitigate at least one disadvantage of previous beverage whitening compositions.

According to an embodiment of the invention, there is provided a beverage whitening composition for replacing cream or milk in a reduced volume comprising: cream having a higher butter fat content than the cream or milk to be replaced; milk having a lower butter fat content than the cream or milk to be replaced; and skim milk powder; the composition having the beverage whitening ability of the cream or milk to be replaced in a target volume of from 30% to 95% of the volume of cream or milk to be replaced.

Further, an embodiment of the invention provides a method of whitening a beverage, comprising adding to the beverage the composition herein described.

According to another embodiment of the invention, there is provided a method of formulating a beverage whitening composition for replacing cream or milk in a reduced volume comprising the step of combining: cream having a higher butter fat content than the cream or milk to be replaced; milk having a lower butter fat content than the cream or milk to be replaced; and serum solids. The composition so formed has the beverage whitening ability of the cream or milk to be replaced in a target volume of from 30% to 95% of the volume of cream or milk to be replaced.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

FIG. 1 is a graphic depiction of parameters to be considered according to an embodiment of the invention.

DETAILED DESCRIPTION

Generally, the present invention provides a composition and method for whitening a beverage. The beverage to be whitened may be any drink that is served hot or cold to which cream or milk may be added. Examples of beverages to which cream or milk are traditionally added include coffee and tea.

As used herein, the term serum solids refers to non-fat solids, typically isolated from milk, but which may also be isolated from other non-milk sources. Examples of serum solids include skim milk powder, isolated non-fat milk components such as milk protein, and whitening products that may be from plant-based sources such as from soy. The term MSNF (milk solids, non-fat) may be used to indicate serum solids derived from milk sources.

As discussed herein, a target volume is defines as a percentage of the original volume. In all instances, the target volume is a reduced volume compared to the amount of cream or milk required to achieve the same whitening effect. For example, if a target volume is 80%, this means that for an original volume of 1000 mL of cream, the beverage whitening composition according to the invention would have a volume of 800 mL. The target volume of 80% results in a reduced volume of 800 mL, compared to the 1000 mL of cream that would have otherwise been required to achieve the same beverage whitening effect, or a beverage whitening effect that is indistinguishable to a consumer of a beverage so whitened.

Aside from target volume, most other quantitative amounts discussed herein are determined on a % wt/wt basis. For example, for butter fat content, or quantities of the components that make up the composition, these are generally given on a % wt/wt basis, as indicated.

The term "b.f." is used herein to mean butter fat.

The term "beverage whitening ability" refers to the lightness of color of a beverage to be whitened using cream or milk. This parameter can be evaluated using visual inspection, for example by a human subject who may be planning on consuming the whitened beverage, or can be determined using instrumentation capable of measuring color-related parameters. Adequate similarity in beverage whitening ability, as would be understood by a person of skill in the art, is deemed to be a level that is either indistinguishable, or acceptably distinguishable to a consumer who may be planning on consuming the whitened beverage. For example, the ability for 18% b.f. cream to whiten a beverage is unacceptably distinguishable to such a consumer in whitening ability as compared with skim milk. A consumer wishing to consume a coffee beverage whitened to the level obtainable by cream would deem this difference to be unacceptably distinguishable.

Beverage whitening ability depends on both the butter fat content and the serum solids content. Thus, for example, if the butter fat content alone is doubled in a cream product, it cannot be used in half the volume to achieve the same beverage whitening ability as the original volume of cream to be replaced. In other words, 10 mL of 20% cream does not have the same beverage whitening ability as 20 mL of 10% cream. As a further example, if the serum solids content alone is doubled in a milk product, it cannot be used in half the volume to achieve the same beverage whitening ability as the original volume of milk to be replaced. In other words, 20 mL of milk will not have the same beverage whitening ability as 10 mL of milk which has been formulated to have double the serum solids volume. The invention is founded on the findings that both serum solids and fat content must be adjusted in order to achieve the same beverage whitening ability, as well as on careful experimentation to develop and optimize compositions able to achieve this objective.

In one embodiment, a beverage whitening composition is provided for replacing cream or milk in a reduced volume comprising: cream having a higher butter fat content than the cream or milk to be replaced; milk having a lower butter fat content than the cream or milk to be replaced; and serum solids. The composition has the beverage whitening ability of the cream or milk to be replaced in a target volume of from 30% to 95% of the volume of cream or milk to be replaced. In other words, a volume of from 300 mL to 950 mL of the composition, depending on the selected target volume, would have the beverage whitening ability of 1 Liter or the cream or milk to be replaced.

When so formulated, the composition contains from 105% (100/95) to 333% (100/30) wt/wt of the butter fat content of the cream or milk to be replaced. The butter fat content of the composition may be calculated as the inverse of the target volume.

Further, the total non-fat solids content of the composition may be from 105% (100/95) to 333% (100/30) wt/wt of the non-fat milk solids content of the cream or milk to be replaced. The total non-fat solids content of the composition may be calculated as the inverse of the target volume.

The butter fat content of the composition (as % wt/wt) may be calculated as $F_T=(F_C \times Q_C)+(F_M \times Q_M)$ wherein $F_C$ is the % wt/wt butter fat content of the cream, $Q_C$ is the % wt/wt of the composition attributable to cream, $F_M$ is the % wt/wt butter fat content of the milk, and $Q_M$ is the % wt/wt of the composition attributable to milk.

The total non-fat solids content of the composition may be calculated as $S_T=(S_C \times Q_C)+(S_M \times Q_M)+(Q_P)$ wherein $S_C$ is the % wt/wt non-fat milk solids content of the cream, $Q_C$ is the % wt/wt of the composition attributable to cream, $S_M$ is the % wt/wt non-fat milk solids content of the milk, $Q_M$ is the % wt/wt of the composition attributable to milk, and $Q_P$ is the % wt/wt of the composition attributable to serum solids.

Cream may comprise from 1 to 90% wt/wt of the composition, the cream component having from 5 to 40% wt/wt butter fat. Milk may comprise from 1 to 90% wt/wt of the composition, the milk component having from 0 to 4% wt/wt butter fat. Serum solids may comprise from 1 to 30% wt/wt of the composition.

An exemplary composition may have 30% wt/wt whole milk having 3.25% wt/wt butter fat, 67% wt/wt cream having 42% wt/wt butter fat, 2.7% wt/wt serum solids, and 0.3% wt/wt stabilizer. Further, another exemplary composition may have 28% wt/wt skim milk, 69% wt/wt cream having 42% wt/wt butter fat, 2.7% wt/wt serum solids, and 0.3% wt/wt stabilizer.

An exemplary target volume may be from 45% to 95%, and a more specific exemplary range for the target volume may be from 60 to 85% of the volume of cream or milk to be replaced. For example, an 18% wt/wt butter fat cream may be replaced in a target volume of 60% so that 600 mL of the composition according to the invention can replace 1 Liter of the 18% cream and still maintain the beverage whitening ability.

The invention also provides a method of whitening a beverage comprising adding to the beverage the inventive composition described herein. Such a beverage requires only the target volume of the inventive composition to be added to achieve the desired effect, which allows a reduced volume to be dispensed into the beverage, compared to using cream or milk.

The invention further provides a method of formulating a beverage whitening composition for replacing cream or milk in a reduced volume comprising the step of combining cream having a higher butter fat content than the cream or milk to be replaced; and milk having a lower butter fat content than the cream or milk to be replaced; with serum solids, so that the composition has the beverage whitening ability of the cream or milk to be replaced in a target volume of from 30% to 95% of the volume of cream or milk to be replaced.

For example, the method of formulating such a composition may comprise combining from 1 to 90% wt/wt of the composition as cream; from 1 to 90% wt/wt of the composition as milk; and from 1 to 30% wt/wt of the composition as serum solids.

In one embodiment of the invention, a cream composition that includes a higher butter fat content and a higher total non-fat solids content (the sum of the "serum solids" plus non-fat solids from the milk and cream components) than the cream to be replaced is provided, thereby allowing a smaller volume to be dispensed into a cup of coffee in order to achieve the same whitening effect and the same butter fat content as 18% b.f. cream. Cream and milk provide the fluid, butter fat, and some serum solids content. Serum solids, such as from skim milk powder, provides remaining total non-fat solids required.

Possible lacteal (milk-based) ingredients for formulating a composition according to the invention include table cream (18% b.f.); half-and-half (10% b.f.) raw cream (41% b.f., 49.9% total solids); whole milk (3.25% b.f.); skim milk, and skim milk powder. These ingredients are readily purchased, but other percentages butter fat in cream or milk may be used. Non-lacteal ingredients may be used in the serum solids component, such as soy-based non-fat solids.

A cream stabilizer may be added to the composition. Possible stabilizers for use with the invention include coffee cream stabilizer CC471 (Continental Custom Ingredients, Oakville, Canada), which includes sodium citrate, disodium phosphate, carrageenan, and dextrose; coffee cream stabilizer Germantown Salvo (Danisco, Scarborough, Canada), containing sodium citrate, sodium phosphate, carrageenan, locust bean gum, and dextrose; or food grade disodium phosphate, such as provided by Astaris (St. Louis, Mo.).

Example 1

Composition for Replacement of 18% b.f. Cream

A cream-based composition is provided which contains (% wt/wt): 30% whole milk (3.25% b.f.); 67% cream (42% b.f.); 2.7% skim milk powder; and 0.3% stabilizers. This composition is concentrated in both butter fat and serum solids, relative to the 18% cream to be replaced, and achieves a target volume of 60% of the 18% b.f. cream it is designed to replace. In other words, 600 mL of the composition will have the beverage whitening ability of 1 Liter of the 18% cream to be replaced. To state this in yet another way, the composition allows about a 40% reduction in the amount of cream dispensed, while achieving good consumer acceptance. A corresponding 40% reduction in the frequency of cream bag replacement in a cream dispenser is realized.

To prepare the composition, dry ingredients were pre-hydrated in approximately the equivalent quantity of whole milk using a lab-scale Silverson high-speed mixer at 5500 rpm for about 5 minutes total mixing time. Following this, the pre-hydrated ingredients were slowly added to the remaining ingredients in a 40 L milk can and mixed for approximately 5 minutes using a pilot-scale Silverson high-speed mixer. All heavy cream samples were processed on a Microthermics HTST/UHT unit by pre-heating to 60° C., and homogenized at 1500 PST (first stage), then at 500 PSI (second stage). The homogenized composition was then pasteurized at 80° C./30 seconds, and immediately cooled to approximately 14° C. Samples were packed into 10 L Schole™ bags and refrigerated.

The resulting product contained 28.92% b.f. A contribution of 12 g of this composition to an 8 oz cup of coffee resulted in 0.49 g protein, 1.28 g of total non-fat solids, and the coffee had a pH of 5.86. Relative to the control, consisting of 18 g of 18% b.f. table cream, the contributions were nearly identical, with 0.49 g protein, 1.25 g milk solids (non-fat) and a pH of 5.85.

The Zahn cup measurement test for coffee whitened according to this example resulted in a measurement of 21.9 sec at 3° C. The control measurement was 18.5 sec at 6° C. The color measurements for whitened coffee was 48.1 (L); 4.8 (a) and 20.3 (b), versus 52.7 (L); 4.2 (a) and 20.3 (b) for the control. Fat globule size in the whitened coffee was 1.93 μm using the composition; and 0.78 μm for the control, which was still deemed within the realm of consumer acceptability. The particle size distribution in terms of specific surface area ($m^2$/mL) was 7.57 for coffee whitened using the composition, versus 10.37 for the control. Overall, these values illustrate the acceptability of the inventive composition as a beverage whitener. The whitening ability is considered adequately similar in the composition versus control to achieve consumer acceptability.

Example 2

Composition for Replacement of 18% b.f. Cream

A cream-based composition is provided which contains (% wt/wt): 28% skim milk; 69% cream (42% b.f.); 2.7% skim milk powder; and 0.3% stabilizers. This composition is concentrated in both butter fat and total non-fat solids. The target volume for the composition is about 60% of the original volume of 18% b.f. cream. This allows about a 40% reduction in the amount of cream dispensed, while providing good consumer acceptance.

To prepare the composition, dry ingredients were pre-hydrated in approximately the equivalent quantity of skim milk using a lab-scale Silverson high-speed mixer at 5500 rpm for about 5 minutes total mixing time. Following this, the pre-hydrated ingredients were slowly added to the remaining ingredients in a 40 L milk can and mixed for approximately 5 minutes using a pilot-scale Silverson high-speed mixer. All heavy cream samples were processed on a Microthermics HTST/UHT unit by pre-heating to 60° C., and homogenized at 1500 PST (first stage), then at 500 PSI (second stage). The homogenized composition was then pasteurized at 80° C./30 seconds, and immediately cooled to approximately 14° C. Samples were packed into 10 L Schole™ bags and refrigerated.

The resulting product contained 28.92% b.f., and a contribution of 12 g of this composition to an 8 oz cup of coffee resulted in 0.49 g protein, 1.29 g of total non-fat solids, and the resulting whitened coffee had a pH of 5.86. Relative to the control, consisting of 18 g of 18% table cream, the contributions were nearly identical, with 0.49 g protein, 1.25 g milk solids (non-fat) and a pH of 5.85.

The Zahn cup measurement test for coffee whitened according to this example resulted in a measurement of 23.4 sec at 3° C. The control measurement was 18.5 sec at 6° C. The color measurements for whitened coffee was 46.4 (L); 5.4 (a) and 20.5 (b), versus 52.7 (L); 4.2 (a) and 20.3 (b) for the control. Fat globule size in the test whitened coffee was 1.61 μm using the composition; and 0.78 μm for the control, which was deemed within the realm of consumer acceptability. The particle size distribution in terms of specific surface area (m²/mL) was 7.47 for coffee whitened using the test composition, versus 10.37 for the control. Overall, these values illustrate the acceptability of the inventive composition as a beverage whitener. The whitening ability of the test composition was deemed to be adequate to replace 18% b.f. cream with good consumer acceptance.

The above-described embodiments of the present invention are intended to be examples only. All documents referred to herein are incorporated by reference in their entirety. Alterations, modifications and variations may be effected to the particular embodiments by those of skill in the art without departing from the scope of the invention, which is defined solely by the claims appended hereto.

The invention claimed is:

1. A beverage whitening composition for replacing a selected cream or milk in a reduced volume, the composition consisting of:
   67% to 69% by weight of cream having about 42% by weight butter fat, and having a higher butter fat content than the selected cream or milk to be replaced;
   28% to 30% by weight of milk having from 0% to 4% by weight butter fat, and having a lower butter fat content than the selected cream or milk to be replaced;
   serum solids; and
   optionally a stabilizer;
   in a target volume of from 45% to 95% of the selected cream or milk to be replaced;
   the composition having the beverage whitening ability of the selected cream or milk to be replaced in the target volume of from 45% to 95% of the volume of the selected cream or milk to be replaced;
   wherein the beverage to be whitened is coffee or tea.

2. The composition of claim 1 wherein the butter fat content by weight % is calculated as:

$$F_T = F_C \times Q_C + F_M \times Q_M$$

wherein $F_C$ is the % wt/wt butter fat content of the cream, $Q_C$ is the portion by weight % of the composition attributable to cream, $F_M$ is the % wt/wt butter fat content of the milk, and $Q_M$ is the portion by weight % of the composition attributable to milk.

3. The composition of claim 1 wherein total non-fat solids content by weight % of the composition is calculated as:

$$S_T = S_C \times Q_C + S_M \times Q_M + Q_P$$

wherein $S_C$ is the % wt/wt non-fat milk solids content of the cream, $Q_C$ is the portion by weight % of the composition attributable to cream, $S_M$ is the % wt/wt non-fat milk solids content of the milk, $Q_M$ is the portion by weight % of the composition attributable to milk, and $Q_P$ is the portion by weight % of the composition attributable to serum solids.

4. The composition of claim 1 wherein serum solids comprise about 2.7 wt/wt of the composition.

5. The composition of claim 1 wherein the stabilizer is present in the composition.

6. The composition of claim 1 consisting of 30% wt/wt whole milk having 3.25% wt/wt butter fat; 67% wt/wt cream having 42% wt/wt butter fat; 2.7% wt/wt serum solids; and 0.3% wt/wt stabilizer.

7. The composition of claim 1 consisting of 28% wt/wt skim milk, 69% wt/wt cream having 42% wt/wt butter fat, 2.7% wt/wt serum solids, and 0.3% wt/wt stabilizer.

8. The composition of claim 1 wherein the target volume is from 60 to 85% of the volume of the selected cream or milk to be replaced; whereby from 600 mL to 850 mL of the composition has the beverage whitening ability of 1 liter of the selected cream or milk to be replaced.

9. The composition of claim 1, wherein the selected cream or milk to be replaced is 18% butter fat coffee cream.

10. A method of whitening a beverage comprising coffee or tea, said method comprising adding to the beverage the composition of claim 1.

11. A method of formulating a beverage whitening composition for replacing a selected cream or milk, in a reduced volume comprising:
   selecting the cream or milk to be replaced; and
   forming, in a target volume of from 45% to 85% of the selected cream or milk to be replaced, the composition consisting of:
   67% to 69% by weight cream having from 5% to 42% by weight butter fat, and having a higher butter fat content than the selected cream or milk to be replaced;
   28% to 30% by weight milk having from 0% to 4% by weight butter fat, and having a lower butter fat content than the selected cream or milk to be replaced;
   serum solids; and
   optionally a stabilizer;
   the composition having the beverage whitening ability of the selected cream or milk to be replaced in the target volume of from 45% to 95% of the volume of selected cream or milk to be replaced;
   wherein the beverage to be whitened is coffee or tea.

12. The method of claim 11, wherein the target volume is from 60% to 85%.

13. A method of whitening a beverage by replacing a selected cream or milk in a reduced volume, said method comprising adding to the beverage a whitening composition consisting of, in a target volume of from 45% to 85% of the volume of the selected cream or milk to be replaced:
   67% to 69% by weight of cream having from 5% to 42% by weight butter fat, and having a higher butter fat content than the selected cream or milk to be replaced;
   28% to 30% by weight of milk having from 0% to 4% by weight butter fat, and having a lower butter fat content than the selected cream or milk to be replaced;
   serum solids; and
   optionally a stabilizer;
   the composition having the beverage whitening ability of the selected cream or milk to be replaced in the target volume of from 45% to 85% of the volume of the selected cream or milk to be replaced;
   wherein the beverage to be whitened is coffee or tea.

14. The method of claim 13, wherein the target volume is from 60% to 85%.

15. The method of claim 11, wherein the stabilizer is present in the composition.

16. The method of claim 11, wherein the selected cream or milk comprises milk.

17. The method of claim 11, wherein the selected cream or milk comprises cream.

18. The method of claim 17 wherein the selected cream or milk comprises 18% butter fat coffee cream.

19. The composition of claim 9, wherein the target volume is 60%.

20. The method of claim 13, wherein the selected cream or milk to be replaced comprises cream.

* * * * *